3,401,119
QUATERNARY AMMONIUM COMPOUNDS
AND PROCESS OF MAKING
Phillip A. Froehlich, Cincinnati, Ohio, assignor to Emery Industries, Inc., Cincinnati, Ohio, a corporation of Ohio
No Drawing. Filed Feb. 16, 1965, Ser. No. 433,156
3 Claims. (Cl. 252—117)

ABSTRACT OF THE DISCLOSURE

A process for preparing quaternary ammonium compounds which comprises reacting an acylated tertiary amine such as N,N-dimethylamino propylamine, or N-methyl, N-ethyl oleylamine with a quaternizing agent such as diethyl sulphate in the presence of a molten fatty acid.

---

This invention relates to an improved process for the production of organic quaternary ammonium compounds which are adapted for various uses, more particularly as detergents, foaming agents, wetting agents, lime curd dispersing agents, germicides and the like.

The invention also relates to the resulting product which is a mixture obtained by forming the quaternary ammonium compound in the presence of a soap-forming fatty acid.

Quaternary ammonium compounds in admixture with fatty acid soaps have particular utility in hard water detergents for preventing scum formation caused by soap curds. U.S. Patent 2,861,955 describes such a hard water detergent consisting essentially of a homogeneous mixture of 80 to 90% by weight of the sodium salts of fatty acids and 10 to 20% of a water soluble quaternary ammonium compound. The product of the present invention is particularly suitable for the preparation of such composite detergents simply by saponifying the soap-forming acid of the mixture with or without addition of more soap.

A quaternary ammonium salt is normally formed by reaction of a quaternizing agent such as an alkyl or aralkyl halide, a dialkyl sulfate, or trialkyl phosphate and a suitable tertiary amine in substantially stoichiometric quantities. This reaction may be illustrated as follows:

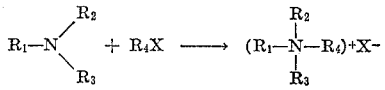

wherein $R_1$, $R_2$ and $R_3$ are usually hydrocarbyl groups with or without functional groups linkages, $R_4$ represents the cationic portion and X represents the anionic portion of a quaternizing agent of the type mentioned above. This reaction occurs as a simple addition reaction without the formation of by-products. For most purposes related to detergency or other surfactant function at least one of the R groups is a long chain hydrophobic group, for example, having from about 7 to 22 carbon atoms, and two or three of such R groups are short chain lower molecular weight hydrocarbyl groups, such as methyl, ethyl, propyl, butyl, etc., to provide hydrophilic-lipophilic balance to the quaternary compound for water solubility or dispersibility. A typical anhydrous quaternary is a soft somewhat plastic substance when solid and a viscous liquid when molten.

Since the group most commonly introduced in quaternizing is an alkyl or aralkyl group, the reaction is often referred to as alkylation. Alkylation is normally accomplished by addition of the alkylating agent to the molten tertiary amine. Although the tertiary amine may be very fluid when molten, as the alkylation to the quaternary salt proceeds to about 80 or 90% completion the reaction product becomes very viscous, requiring a high powered sweep type agitator to maintain the reaction mixture uniform and to assist heat transfer since the reaction is exothermic. To reduce the viscosity and improve processing properties, a nonreactive diluent or solvent such as benzene, isopropyl alcohol, mixed hydrocarbons or the like may be added. In this case, equipment having normal agitation, i.e. a propeller agitator, may be used. However, recovery of the solvent is necessary to operate the process economically, unless the quaternary is to be sold in an alcoholic solution. Where it is desired to prepared it as an aqueous solution the organic solvent must be removed. Furthermore, these relatively volatile solvents frequently have low flash point and hence introduce a fire hazard.

It is a principal object of the invention to obviate the difficulties encountered in forming quaternary ammonium compounds by alkylation of molten tertiary amines. The process of the invention eliminates the necessity of special high powered agitation or the use of diluents or solvents which are extraneous to the desired end product.

A further object of the invention is to provide a process for production of quaternary ammonium salts in which the resulting product may be used to directly produce composite detergents comprising the quaternary ammonium compound and a fatty acid soap. Another object is to provide a novel composition which is a precursor for composite detergents comprising a water soluble or dispersible quaternary ammonium salt and a soap-forming fatty acid.

I have discovered that fatty acids may be used as a diluent or solvent during the alkylation of tertiary amines to the quaternary salt. At temperatures slightly above the melting point of the tertiary amine-fatty acid mixture, fatty acids prevent the characteristic increase in viscosity and retain a desired fluidity in the melt. This permits use of simpler apparatus for agitation and cooling, more rapid addition of the alkylating agent, and also eliminates the need for a solvent which must be removed. In this manner, a product containing up to about 90% active quaternary ammonium salt may be made which is an easily handled fluid at temperatures above the melting point of the product.

The invention is applicable to all instances where admixture of the quaternary ammonium compound with a soap is desired, for example, in hard water detergents. The fatty acid used as the diluent may be neutralized with a suitable organic or inorganic alkali to form a portion or all of the soap required in the composite product. In such cases the fatty acid selected is generally one which is used in conventional soaps, for example, any fatty acid or mixture of acids derived from animal fats or vegetable oils, particularly stearic, palmitic and oleic. When so used, the fatty acid soap preferably will form from 80 to 90% by weight of the composite as taught in U.S. Patent 2,861,955 above-mentioned.

The invention is especially useful when the quaternary ammonium salts are those in which a fatty acid is reacted with a diamine of the primary-tertiary type to form an amido-amine before alkylating the tertiary amine group to produce the quaternary salt. Such quaternary compounds are illustrated by the general formula:

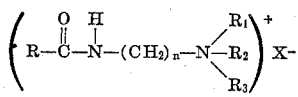

in which R is an aliphatic hydrocarbyl group, or mixture of such groups containing from 7 to 22 carbon atoms, $n$ is an integer from 2–6, $R_1$ is a lower molecular weight alkyl group, such as methyl, ethyl, propyl, isopropyl, and butyl, and $R_2$ is a radical selected from the group consisting of lower alkyl as defined for $R_1$ or

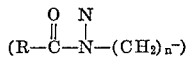

the latter providing N bis amido amines. $R_3$ is selected from the group consisting of alkyl and aralkyl hydrocarbyl radicals and represents the cationic portion of the alkylating agent and X represents the anion of the quaternizing agent, such as halide, hydrogen sulfate, methyl or ethyl sulfate, dialkyl phosphate, thiocyanate, or other anions used in quaternizing agents known in the art. Alkylating agents commonly used are short chain alkyl or aralkyl compounds, for example, diethyl sulfate, triethyl phosphate, benzyl chloride, methyl bromide, methyl chloride. Also long chain compounds such as dodecyl bromide may be used if it is desired to introduce a hydrophobic group in the quaternizing reaction.

Products of this type are prepared by the reaction of a fatty acid with a diamine containing both a primary and a tertiary amino group, e.g. N,N dimethylamino propylamine, removing the water of a reaction and subsequently quaternizing with a suitable quaternizing agent as previously described. Other suitable N,N dialkyl-substituted alkylene diamines are those represented by the formula:

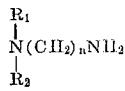

wherein $R_1$, $R_2$ and $n$ are defined as in the formula above.

In its broader aspects, the invention includes alkylation of long chain tertiary amines, including tertiary monoamines such as N-methyl, N-ethyl oleylamine and other lower molecular weight N-dialkyl or aralkyl substituted fatty amines having carbon chains of from $C_7$ to $C_{22}$ to form quaternary ammonium compounds in the presence of molten fatty acids without previous amide formation.

The fatty acid employed to form the amide or to act as diluent in the quaternizing reaction may be selected from a wide variety of naturally occurring or synthetically produced $C_7$ to $C_{22}$ monocarboxylic acids. Representative acids are heptanoic, caprylic, pelargonic, capric, lauric, myristic, palmitic, stearic, arachidic, behenic, oleic, palmitoleic and linoleic acids. In many cases it is preferable to employ mixtures of fatty acids as obtained on the pressure splitting of a natural glyceride such as safflower, soya bean, corn, sunflower seed, peanut, linseed or tung oil, or by the similar treatment of tallow or other animal fats or oils. Similarly, fractions of the fatty acid mixtures so obtained can also be employed, e.g., the solid acid fraction separated from tallow acids by solvent crystallization. The acid mixture may be used as such or it may be subjected to a partial or complete hydrogenation treatment before being employed to form the amide intermediate which is then reacted with the quaternizing compound.

The preferred amide-forming embodiment of the invention affords a separate and distinct advantage over the generic aspects of the invention. Normally the reaction to form the amide is carried out with an excess of amine to drive the reaction to a suitable completion. It has been found that about a 35% excess amine is required when higher fatty acids such as palmitic or stearic acid are used in order that the reaction be completed in a commercially feasible time. The excess amine is not immediately recoverable, since it is soluble in the water formed during amidation. However, by the process of this invention, an exces of acid is used, hence only stoichiometric quantities of amine are required. It has been found that under proper conditions, less than 1% of amine is lost in the distillation of the water formed during amidation.

The invention is further illustrated by the complete specific embodiments shown in the following examples which represent the best mode presently known for the practice of the invention.

Example I

This example illustrates a typical preparation of a quaternary ammonium compound not utilizing the invention. The equipment used consisted of a three necked, three liter Pyrex flask heated with an electric heating mantle. The flask is further equipped with agitator, a thermowell and a Dean and Stark distillation head connected to a reflux condenser. The flask was charged with 1650 g. of a commercial palmitic acid having an average molecular weight of 271; 822 g. of dimethyl amino propyl amine having a molecular weight of 102.2, the amine being present in 35% excess above stoichiometry, and 210 g. of toluene representing 8% of the total charge, to assist removal of the water formed during amidation by azeotropic distillation.

The temperature of the reaction was increased from 145° C. to 185° C. over a period of 5½ hours during which the water of amidation was removed as formed. The Dean and Stark trap was replaced by a distilling head, condenser and receiver, and the pressure was reduced to 100 torr for a period of 1 hour at 185° to remove the excess amine and toluene. The recovered amine was not readily reusable since a portion was dissolved in the water of amidation and the remainder in the toluene. Analysis of the produce revealed 2.8% free fatty acid (M.W.=271) and 100.4% amide (M.W.=355). It was an off-white waxy solid at room temperature.

Approximately 852 g. of this product was transferred to a laboratory stainless steel quaternary kettle. This vessel is electrically heated and is equipped with a stainless steel U-shaped scraping agitator driven by a high torque producing motor, a thermowell and baffles. The amide was melted and heated to 77° C. and 377 g. of diethyl sulfate (2% excess) was added dropwise at a fast rate. Heating was continued until the temperature reached 100° C. at which time the rate of addition was adjusted to maintain the temperature between 100° C. and 110° C. without further external heat. When about 80% of the diethyl sulfate was added a decided increase in viscosity was observed. The viscosity continued to increase as the remainder of the alkylating agent was added until at the end of the reaction the product was a very thick paste at 100° C. The addition of the diethyl sulfate required approximately 1½ hours, after which external heat was supplied and agitation was continued for 1 hour at a temperature of 100° C. The product was essentially neutral to methyl purple indicator, indicating the reaction was complete.

Example II

The following example illustrates the present invention and its advantages. In this reaction the desired product was to contain approximately equal part of quaternary ammonium salt and free fatty acid. Therefore, 1140 g. of a commercial palmitic acid having an average molecular weight of 261 was charged into a three liter, three necked flask, electrically heated and equipped with a thermowell, a bent glass rod agitator, and an electric motor drive. When the palmitic acid was melted (77° C.) 519 g. of dimethylamino propylamine was added with good agitation. A reflux condenser was installed and the flask was heated to 160° C. in approximately 1 hour with total reflux. At this time, the reflux condenser was replaced with a distilling head, condenser and receiver and the reaction was continued for about 1 hour during which the temperature was increased to 200° C. and the water of amidation was distilled off as formed. The temperature was lowered to 170° C. and the pressure reduced to about 100 torr for thirty minutes after which the temperature was increased to 200° C. over a period of 30 minutes. The reaction product was cooled under reduced pressure. Analysis showed the free fatty acid content of the amide-acid mixture to be 57.7% (M.W.=261). The amide with the excess fatty acid (1222 g.) was transferred to another flask similarly equipped except that the distillation apparatus was replaced by a Claison head and a dropping funnel. The amide was melted and heated to 100° C. and 223 g. of diethyl sulfate was added at a fast rate over a 90 minute period. No increase in viscosity was noted. It was necessary to apply low heat to maintain the reaction temperature at 100° C. to 105° C. indicating good heat dissipation. The (3 palmitylamidopropyl) dimethyl ethyl ammonium ethosulfate quaternary product containing excess fatty acid was neutral to methyl purple (pH—4.8–5.4), analyzed 50.2% free fatty acid, and was dispersible in water.

Example III 2632 g. of commercial stearic acid (average molecular weight=268) was charged into a five liter flask fitted for distillation and a nitrogen sparge tube. The stearic acid was melted and 347.5 g. of dimethylamino propylamine was added. The temperature was increased to 200° C. over a 2 hour period and the water of amidation was distilled off as formed. 59.5 g. of distillate were obtained. The pressure was reduced to 100 torr and the temperature was maintained for 2 hours then the product was cooled under vacuum to 95° C. and the vacuum was released. 2.8 g. more of distillate were obtained or a total of 62.3 g. vs. 61.2 g. theoretical water of amidation. 532.6 g. of diethyl sulfate were added over a period of 45 minutes at a temperature of 100–110° C. No noticeable viscosity increase was observed. The pressure was reduced to 100 torr for a period of 45 minutes, then the product was cooled. A nitrogen sparge was maintained throughout the reaction. The (3 stearylamidopropyl) dimethyl ethyl ammonium ethosulfate product contained 50.5% free fatty acid.

Example IV

The purpose of this run was to prepare a coconut oil fatty acid based product using a minimal excess of fatty acid, i.e. 10%. Following the procedures described in Example III, 1030 g. of a commercial coconut oil fatty acid ($C_8$ to $C_{14}$, predominately the latter) having an average molecular weight of 210 were reacted with 460 g. of dimethyl amino propyl amine. The reaction was completed in about 2 hours followed by 3 hours of vacuum stripping (100 torr). A loss of about 70 g. of amine (about 3%) was encountered. 1085 g. of this amide product containing excess fatty acid was reacted with 462 g. of diethylsulfate over a period of 1¼ hours. The final product contained 12.2% free fatty acid (M.W.=210)

and set to a firm paste at room temperature. At 100° C. the product is a somewhat viscous fluid but could be easily agitated with a bent glass rod stirrer.

Example V

In equipment previously described in Example III, 390 g. of dimethylamino propylamine were reacted with 970 g. of a commercial stearic acid having an average molecular weight of 276 and 575 g. of a commercial pelargonic acid (predominately $C_9$ acid) having an average molecular weight of 160. The reaction mixture was heated to 180° in a period of 1 hour, then to 190° C. over a period of 30 minutes. The pressure was reduced to approximately 100 torr and the temperature was maintained for an additional hour. The product was cooled under reduced pressure. The water of amidation was removed as formed; 85.6 g. of distillate were obtained.

Analysis of the distillate showed 26% amine which indicates a loss of less than 6% of the amine charged. The product contained 55% amide. 600 g. of this product was alkylated by adding 175 g. of diethyl sulfate over a period of one hour at a temperature of 103° C. to 108° C. The pressure was then reduced to approximately 100 torr for a period of 45 minutes and the product was cooled under reduced pressure. The quaternary ammonium product was a thin fluid when molten and set to a semi-crystalline solid at room temperature. Analysis showed 32.8% free fatty acid of 212 average molecular weight.

A sample of the product of Example IV containing only 12% excess fatty acid over quaternary ammonium salt is reacted with alkali (NaOH) slightly in excess of stoichiometric with respect to the free fatty acid. The resulting fatty acid soap-quaternary ammonium salt composite forms clear aqueous solutions. While 100% soap solutions in hard water (100 p.p.m. hardness) produce visible scum (tacky, water repellant precipitate sticking to the sides of the container at the liquid interface), the solutions of the composite 90% fatty acid soap -10% quaternary of the invention produced no scum.

Example VI

Approximately 298 g. of a commercial distilled dimethyl hydrogenated tallow amine was heated to 90° C. in a 1 liter flask. The four-necked flask was electrically heated and equipped with a thermowell, agitator, reflux condenser and dropping funnel. Diethyl sulfate was added dropwise at a rate to maintain the temperature between 100° and 110° C. Good agitation was maintained until about 100 g. of diethyl sulfate had been added. The viscosity of the reaction product had gradually increased until at this point mixing was obviously incomplete. Therefore, 90 g. of a commercial stabilized partially hydrogenated tallow acid was added. The reaction product immediately became fluid, free flowing and complete mixing was accomplished again. Addition of diethyl sulfate was continued until a total of 142 g. had been added. About 80 minutes were required for the addition of the first 100 g. while the last 40 g. were added in about 20 minutes. This example illustrates that the use of fatty acids not only reduces the viscosity of the reaction mix to a workable level but allows more rapid addition of the alkylating agent. The resulting product was a brown plastic solid at room temperature, analyzed 17.7% free fatty acid (M.W.=270).

The term "long chain alkylated tertiary amine" as used herein is not limited to alkyl amines, but includes those amines having functional groups, such as the amides exemplified, wherein the long chain alkyl group may be a part of an acyl radical.

What I claim is:

1. A process for the preparation of quaternary ammonium compounds which comprises reacting an amine selected from the group consisting of N-di lower alkyl oleyl amine and compounds having the formula:

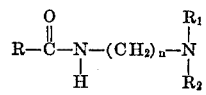

wherein R is an alkyl group having from 7 to 22 carbon atoms, $R_1$ and $R_2$ are lower alkyl groups, and $n$ is an integer from 2 to 6, with a quaternizing agent in the presence of at least 10% by weight of a molten fatty acid having from 7 to 22 carbon atoms.

2. The process of claim 1 wherein $R_1$ and $R_2$ are methyl groups and $n$ is 3.

3. The process of claim 1 wherein said fatty acid is used in an excess up to 90 percent by weight.

References Cited

UNITED STATES PATENTS 2,861,955  11/1958  Aylesworth _____ 252—117

LEON D. ROSDOL, *Primary Examiner.*

B. BETTIS, *Assistant Examiner.*